MANUFACTURE OF SUBSTANTIALLY NON-SAGGING REFRACTORY METAL WIRE

Filed March 19, 1970

INVENTORS.
RICHARD F. CHENEY &
THEODORE L. WEAVER

BY Donald R. Castle
ATTORNEY

United States Patent Office 3,682,720

Patented Aug. 8, 1972

3,682,720

MANUFACTURE OF SUBSTANTIALLY NON-SAGGING REFRACTORY METAL WIRE

Richard F. Cheney, Towanda, and Theodore L. Weaver, Troy, Pa., assignors to Sylvania Electric Products, Inc.

Filed Mar. 19, 1970, Ser. No. 20,973
Int. Cl. H01k *1/02;* C21d *1/00*
U.S. Cl. 148—126 8 Claims

ABSTRACT OF THE DISCLOSURE

The non-sagging property of refractory metal wire can be substantially improved by incorporating into the process of manufacturing refractory metal wire the additional step of heat treating the as-drawn wire under controlled conditions for a sufficient length of time.

BACKGROUND OF THE INVENTION

Field of the invention

This invention relates to an improved process of manufacturing substantially non-sagging refractory metal wire. Specifically, it relates to an improved process for manufacturing non-sagging refractory metal wire by incorporating into the process of manufacturing refractory metal wire the additional step of heat treating, in a specified temperature range, the as-drawn wire in a non-oxidizing atmosphere for a sufficient length of time. More specifically, this invention relates to an improved process for manufacturing essentially non-sagging lamp type tungsten filament wire.

Description of the prior art

Although not necessarily limited thereto, this invention has particular application to, and will be described with reference to, lamp-type tungsten filament wire.

In the manufacture of a metal-filament lamp, it is well documented in the prior art that the basic filament material in incandescent lamps, tungsten, is generally prepared by converting high-purity tungsten trioxide along with proper amounts of certain added compounds to metal powder, pressing the metal powder into bars, sintering the bars in a non-oxidizing atmosphere, swaging the sintered bars into thin rods, and drawing the rods through dies to decrease the wire to the desired diameter. The completed lamp consists essentially of the tungsten filament enclosed in a glass bulb which usually contains argon, nitrogen or a mixture of the two. The filaments are wound by procedures known to one skilled in the art. During regular performances, the filaments are heated above their recrystallization temperature, generally from about 2200° C. to about 3000° C.

A major problem in the manufacture of long performance, high quality tungsten filament lamps is the tendency of the tungsten filament to sag, which in turn greatly reduces the life of the bulb. This sagging is carried by the weight of the coil and gravity, and is thought to occur by grain boundary slidings which results to an extreme degree when the wire has a non-interlocking small crystalline size. In any case, it is known that non-sag properties are improved by increasing the interlocking grain structure.

British Patent 267,312 attempted to improve the non-sagging characteristics by heating the coiled filaments before their incorporation into lamps. The coiled filaments became very brittle after heating, however, and the difficulty in handling the heat-treated coiled filaments, coupled with the added cost due to a relatively high breakage loss, prevented this method from being widely accepted.

The accepted procedure for the production of wire with good high-temperature non-sag properties, in the present tungsten lamp industry, is to add proper amounts of potassium, silicon, and aluminum to the tungsten oxide before it is reduced to metal powder. As a result of the simultaneous presence of potassium, silicon, and aluminum, the wire develops a large crystalline structure that has interlocking grain boundaries, usually running at an acute angle to the wire surface, which prevents sag (grain boundary sliding).

It has been found unexpectedly that by heating the as-drawn wire from about 1200° C. to about 2000° C., for about 30 seconds in a non-oxidizing atmosphere will produce, upon recrystallization, much longer grains and consequently fewer grain boundaries than wire not subjected to the heat treatment or non-heat-treated wire containing aluminum, potassium, and silicon. The recrystallized grains still have the desired interlocking grain boundaries.

It is believed, therefore, that a process which improves the non-sag characteristics of refractory metal wire, and, in particular, lamp-type tungsten filament wire, by producing much longer grains than non-treated wire, and still have interlocking grain boundaries is an advancement in the art.

SUMMARY OF THE INVENTION

In accordance with one aspect of the invention, there is provided in the manufacture of refractory metal wire, the improvement comprising the additional step of heating the as-drawn wire in a non-oxidizing atmosphere having a temperature of from about 1200° C. to about 2000° C., for at least about 30 seconds.

DESCRIPTION OF THE PREFERRED EMBODIMENTS

For a better understanding of the present invention, together with other and further objects, advantages and capabilities thereof, reference is made to the following disclosure and appended claims in connection with the above description of one of the aspects of this invention.

In the process of this invention, the as-drawn refractory metal wire is heated for about at least about 30 seconds at a temperature of from about 1200° C. to about 2000° C. Although the preferred range for heat treating the wire will depend, to a great extent, upon the prior history of the wire, temperatures that are preferred for wire having a diameter from about 1 mil to about 4 mils are from about 1200° C. to about 1900° C. The preferred heat treating range for wire having a diameter from about 8 mils to about 11 mils is from about 1400° C. to about 1550° C. Although some large interlocking crystalline structures can develop when most any refractory metal wire is employed, lamp-type tungsten filament wire is especially preferred.

Figure 1:
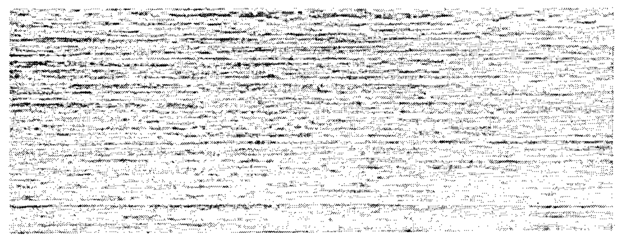
FIG. 1 is a photomicrograph of a 9.45 mil diameter tungsten wire illustrating the crystal structure of wire that is treated using insufficiently high temperatures.
Figure 2:
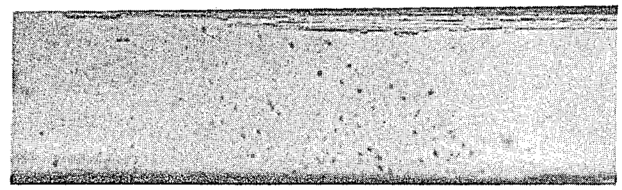
FIG. 2 is a photomicrograph of a 9.45 mil diameter tungsten wire illustrating the improved crystal structure of wire that is treated in accordance with this invention.
Figure 3:
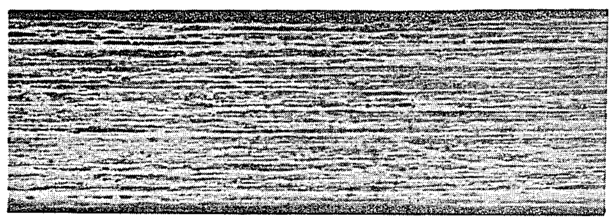
FIG. 3 is a photomicrograph of a 9.45 mil diameter tungsten wire illustrating the crystal structure of wire that is treated using excessively high temperatures.

FIG. 1 is a photomicrograph of a typical lamp-type tungsten filament wire, heat treated below the preferred temperature range. FIG. 2 is a photomicrograph of a similar tungsten wire heat treated within the preferred temperature range. FIG. 3 is a photomicrograph of a similar wire heated above the preferred temperature range. As illustrated therein, the crystalline structure of the 9.45 mil wire subjected to heat treatment at 1500° C.

for about 30 seconds is shown to differ greatly from the crystalline structure of the 9.45 mil wires subjected to heat treatment at 1370° C. and 1735° C. Below about a 30-second heat treatment, the development of the large crystalline texture is not complete. Longer than about a 30-second heat treatment is usually avoided for economics.

In addition to a superior resulting crystalline structure in the wire, the heat treatment also imparts the added improvement of lowering the recrystallization temperature of the wire generally from about 130° C. to about 205° C. Lower recrystallization temperatures are desirable from an economics standpoint.

Care must be taken to avoid oxidation of the wire. To avoid oxidation of the wire, the wire is heat treated in a non-oxidizing atmosphere. Any oxygen-free atmosphere can be used, such as nitrogen, hydrogen, carbon dioxide, inert gases such as Freon, kayton and the like, however, hydrogen is the preferred non-oxidizing atmosphere. For practical purposes, the process is usually continuous by running the wire through an appropriate furnace having a non-oxidizing atmosphere and of sufficient length to insure that the specified temperature is maintained for at least about 30 seconds with from about 30 to about 35 seconds being preferred.

In order to more fully illustrate the invention, the following detailed examples are presented. All parts, percentages, and proportions are by weight unless otherwise indicated.

Example 1.—Short lengths of about 9.45 mil tungsten wire are heat treated using electrical resistivity under hydrogen in a closed chamber. The temperature is measured with a two-color pyrometer, and the obtained values are converted to true temperatures using a calibration chart supplied by the manufacturer of the instrument.

Ten wire samples are first heated for about 15 seconds by increasing the electrical current in about ½ amp increments from about 9 amps to about 17 amps, to determine the recrystallization temperature. At about 16.5 amps equivalent to about 2820° C. three of the ten wire samples show recrystallization, and at about 17.0 amps (2865° C.) seven of the ten samples show recrystallization. The recrystallization temperature range is therefore established as about 16.5 amps (2820° C.) to about 17 amps (2865° C.).

The effect of heat treating the wire samples before recrystallization is determined by heating short lengths of the wire for about 30 seconds at amperages below that necessary for recrystallization. The wires are heat treated at about 9.5 amps (1370° C.), 9.70 amps (1400° C.), 10.05 amps (1450° C.), 10.40 amps (1500° C.), 10.74 amps (1550° C.), 11.09 amps (1600° C.), and 12.03 amps (1735° C.). Heat treating the wires from about 9.7 amps to about 10.74 amps produced wires having much longer grain than wire treated at above and below the aforementioned range and did not alter the crystalline structure of the wire. The heat-treated samples are heated at about 15 seconds at about 15 amp (2660° C.) and establishes only those previously heated at from about 9.7 amp to about 10.74 amp had lower recrystallization temperatures.

Example 2.—Example 1 is repeated using a 2.3-mil tungsten wire. The recrystallization temperature is established as about 3.31 amps (2510° C.) to about 3.34 amps (2560° C.). The effect of heat treating the wire samples is determined by heating short lengths of the wire for about 30 seconds at amperages below that necessary for recrystallization. The wires are heat treated at about 2.34 amps (1650° C.), 2.37 amps (1700° C.), 2.42 amps (1750° C.), 2.46 amps (1800° C.), 2.50 amps (1850° C.), 2.54 (1900° C.), and 2.63 amps (2000° C.). Heat treating the wires from about 2.37 amps (1700° C.) to about 2.54 amps (1900° C.) produced substantially the same results which are achieved in Example 1 except that the recrystallization temperature is lowered to about 2380° C.

While there have been shown and described what are at present considered the preferred embodiments of the invention, it will be obvious to those skilled in the art that various changes and modifications may be made therein without departing from the scope of the invention as defined by the appended claims.

We claim:

1. In the process of manufacturing refractory metal wire wherein said refractory metal wire is produced from a metal powder obtained through normal powder metallurgy techniques and is thereafter pressed into bars, annealed, presintered, hydrogen reduced, swaged, and thereafter continuously drawn to a diameter from about 1 mil to about 20 mils, the improvement comprising the additional step of heating the wire after the final drawing step in a non-oxidizing atmosphere at a temperature from about 1200° C. to about 2000° C. for at least about 30 seconds, whereby the recrystallization temperature of said refractory metal wire is thereby lowered from about 130° C. to about 205° C.

2. A process according to claim 1, wherein said refractory metal wire is a lamp-type tungsten filament wire.

3. A process according to claim 1, wherein said diameter is from about 1 mil to about 4 mils and said heat treatment is from about 1700° C. to about 1900° C.

4. A process according to claim 3, wherein said heat-treatment time is from about 30 to 35 seconds.

5. A process according to claim 1, wherein said diameter is from about 8 mils to about 11 mils and said heat treatment is from about 1400° C. to about 1550° C.

6. A process according to claim 5, wherein said heat treatment is for from about 30 to 35 seconds.

7. A process according to claim 1, wherein said non-oxidizing atmosphere is an hydrogen atmosphere.

8. A process according to claim 1 wherein said additional step is continuous.

References Cited

UNITED STATES PATENTS 3,278,281 9/1966 Ehringer ------------ 75—207

LELAND A. SEBASTIAN, Primary Examiner

R. E. SCHAFER, Assistant Examiner

U.S. Cl. X.R.

29—182; 75—207, 224